(12) United States Patent
Bordignon et al.

(10) Patent No.: US 6,220,812 B1
(45) Date of Patent: Apr. 24, 2001

(54) SEPARATION DEVICE FOR ROLLED BARS

(75) Inventors: Giuseppe Bordignon, Bicinicco; Andrea De Luca, Remanzacco; Luca Pecoraro, Udine, all of (IT)

(73) Assignee: Danieli & C. Officine Meccaniche SpA, Buttrio (IT)

( * ) Notice: Subject to any disclaimer, the term of this patent is extended or adjusted under 35 U.S.C. 154(b) by 0 days.

(21) Appl. No.: 09/414,946

(22) Filed: Oct. 8, 1999

(30) Foreign Application Priority Data

Oct. 8, 1998 (IT) .............................. UD98A0172

(51) Int. Cl.[7] .................................................. B65G 25/08
(52) U.S. Cl. .................................... 414/745.7; 198/459.1; 198/468.1
(58) Field of Search ............................. 198/459.7, 463.6, 198/468.1, 775, 777; 414/745.7, 746.4

(56) References Cited

U.S. PATENT DOCUMENTS

| | | | |
|---|---|---|---|
| 3,151,747 | * 10/1964 | McGoogan | 414/746.4 X |
| 3,502,191 | * 3/1970 | Valo | 198/459.7 |
| 4,245,735 | * 1/1981 | Valo | 414/746.4 X |
| 4,431,367 | * 2/1984 | Pousette et al. | 198/463.6 X |
| 4,911,283 | * 3/1990 | Hollins | 414/746.4 X |

FOREIGN PATENT DOCUMENTS

| | | |
|---|---|---|
| 1011217 | 11/1965 | (GB) . |
| 9921666 | 5/1999 | (WO) . |

* cited by examiner

Primary Examiner—Janice L. Krizek
(74) Attorney, Agent, or Firm—Antonelli, Terry, Stout & Kraus, LLP

(57) ABSTRACT

Device to separate rolled bars (12) advancing on a carrier plane (11) with a direction substantially orthogonal to their axis towards a tying and/or packing zone, the carrier plane (11) comprising a plurality of movement elements (14) arranged in the direction of advance of the bars (12) and longitudinally separated, there being included a counter/spacer device (13) suitable to separate the bars (12) from each other in correspondence with a leading end segment, the device comprising a plurality of separator assemblies (10) arranged in alignment along a direction parallel to the longitudinal axis of the bars (12) and each arranged in the space between two adjacent movement elements (14), each separator assembly (10) comprising separator elements having a first inactive position arranged retracted below the carrier plane (11) of the bars (12) and a second active position wherein they are taken progressively above the carrier plane (11) and, inserting themselves between two adjacent bars (12), cause the progressive separation thereof.

15 Claims, 3 Drawing Sheets

SEPARATION DEVICE FOR ROLLED BARS

FIELD OF THE INVENTION

This invention concerns a separation device for rolled bars.

The invention is employed, in the zone where layers or packs of bars are formed, to separate, distance and align the bars arriving from the cooling zone located downstream of the rolling or finishing line, in order to obtain a better, more regular and more accurate packing of said bars.

The invention, in co-operation with a counter device, allows to prepare layers or packs consisting of a desired number of bars, and allows to avoid counting errors due to the bars being superimposed and twisted along the transport plane.

The device according to the invention is used in the preparation of long rolled products in bars, particularly if emerging from multi-profile rolling.

BACKGROUND OF THE INVENTION

Downstream of the finishing train, rolling plants for bars and profiles normally provide a cooling zone and a zone for the formation of bundles or layers in which the bars are counted and, when the desired number for the formation of the bundle is reached, tied and discharged.

In the bundle-forming step, there is the problem that the bars arranged on the carrier plane, particularly if emerging from a multi-profile formation process, are often superimposed and twisted lengthwise, so that it is difficult to count them accurately and without mistakes, and difficult to separate the last bar of one layer from the first bar of the next layer.

There have been proposals for separation devices which raise the leading end of the last bar in one layer with respect to the carrier plane in order to separate it from the adjacent bar.

This lifting is problematic at times and is not able to separate bars which overlap or are twisted together for a considerable part of their length. Moreover, lifting the bars from the carrier plane may cause them to be axially misaligned.

Other solutions have proposed movable blades or arms arranged below the carrier plane and suitable to be inserted into the gap between two adjacent bars in order to separate them.

These means are only able to separate the bars in correspondence with the leading ends, they cannot eliminate twisted and overlapping bars.

Moreover, they only give a minimum separation, which is not sufficient to ensure accurate counting and easy manipulation.

These problems therefore cause mistakes and the formation of layers which are not homogeneous, creating considerable problems in the subsequent step of tying and packing the bundles of bars.

The problems are even greater in the case of multi-profile rolling and the thinner the bars are, in which case the possibility of the bars being overlapping and twisted on the carrier plane is even higher.

The present Applicant has devised, tested and embodied this invention to overcome the shortcomings of the state of the art and to obtain further advantages.

SUMMARY OF THE INVENTION

The purpose of the invention is to provide a device which allows to efficiently separate and distance adjacent bars on a carrier plane which are to be sent to a tying or packing zone or where layers are formed.

A further purpose is to obtain, at outlet from the separation device, bars which are perfectly aligned lengthwise to be sent to the pack- or layer-forming zone.

The separation device according to the invention co-operates with counter means suitable to count the bars which are progressively made to advance along a carrier plane.

The carrier plane consists of movement elements which are separated lengthwise from each other and suitable to displace the bars in a direction orthogonal to the axis of the bars.

In a preferential embodiment, the device according to the invention also co-operates with partial spacer means which act in correspondence with the leading end of the bars.

The separation device according to the invention comprises a plurality of separator assemblies arranged in alignment in a direction substantially parallel to the longitudinal axis of the bars arranged on the carrier plane.

Each separator assembly is arranged in the space between two adjacent movement elements on the carrier plane and has at least separator means associated with movement means suitable to make them rotate with respect to a substantially horizontal axis.

According to a variant, every separator assembly comprises a pair of separator means counter-opposed and rotating on respective horizontal axes with an opposite direction of rotation.

In this case, every separator mean is suitable to act on a respective bar and two adjacent bars are distanced in opposite directions by the action of the respective separator means.

According to a further variant, every separator assembly comprises two or more separator means, or two or more pairs of separator means, separated longitudinally along the bar, each of which is suitable to act on a respective segment of a relative bar.

In this case, according to a further embodiment, the two or more separator means, or the two or more pairs of separator means, are suitable to act on the bars in a temporal progression according to their position with respect to the leading end of the bars.

To be more exact, first the separator means nearest the leading end of the bar act, then, in sequence, the separator means which are gradually further from the leading end of the bar act, thus determining a progressive separation of two adjacent bars.

The separator means have a first inactive position arranged retracted below the plane carrying the bars, and a second operating position in which they are taken progressively above the carrier plane and, inserting themselves between two adjacent bars, cause them to be progressively separated.

The separator means have an arched profile suitable to act on the bar gradually as the means are taken above the carrier plane.

According to one embodiment of the invention, the arched profile of each of the separator means is defined by at least a first segment which has the function of displacing the relative bar while the separator means are being raised, and a second segment which does not generate any displacement on the bar even if the separator mean is further raised with respect to the carrier plane.

According to a variant, the separator assemblies are activated in a temporal progression in which the leading separator assembly is activated first, and then all the others are gradually activated, so as to cause two adjacent bars to be progressively distanced from the leading end to the trailing end thereof.

BRIEF DESCRIPTION OF THE DRAWINGS

The attached drawings are given as a non-restrictive example, and show a preferential embodiment of the invention wherein.

DETAILED DESCRIPTION OF PREFERRED EMBODIMENT

Figure 1:
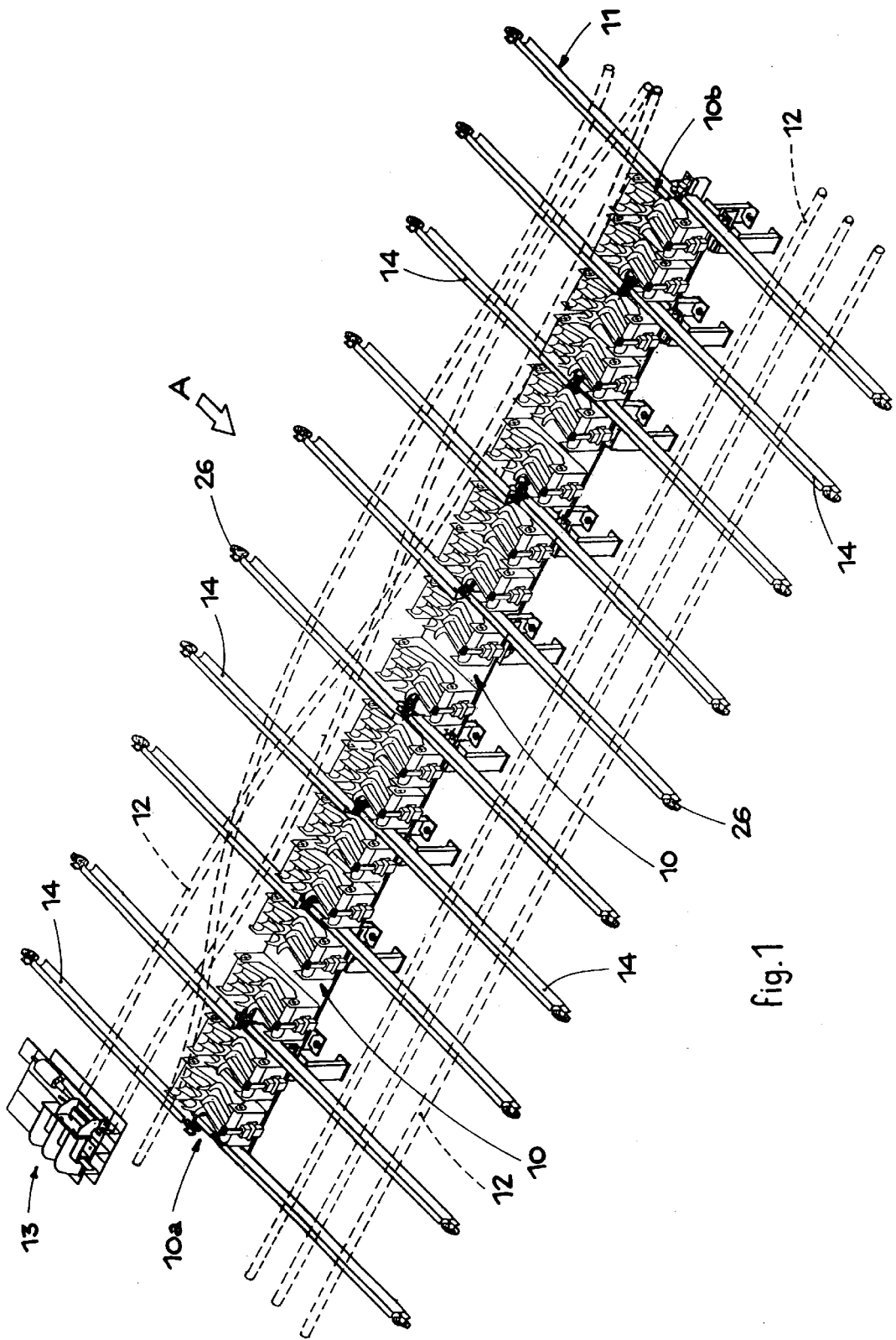
FIG. 1 shows a three-dimensional view of the separation device for rolled bars according to the invention applied to a plane to carry bars.

With reference to the attached Figures, the reference number 10 denotes generally an assembly to separate rolled bars 12, which is a part of a separation device comprising a plurality of said assemblies 10 arranged in alignment in a direction substantially parallel to the longitudinal axis of the bars 12.

The bars 12 arrive from the cooling zone or bed, located downstream of the rolling or finishing line, and are arranged on a carrier plane 11 defined by a plurality of chain-type movement elements 14, arranged parallel to each other and distanced lengthwise.

The movement elements 14 are driven by respective means 26 and are suitable to progressively displace the bars 12, in a direction "A" orthogonal to their longitudinal axis, from the entrance to the exit of the carrier plane 11.

Downstream of the carrier plane 11 there is a zone (not shown here) where packs or layers of rolled bars 12 are prepared, where there are appropriate devices for tying and packing of a conventional type.

In co-operation with the leading end of the bars 12 and upstream of the separator assemblies 10, there is a counter/spacer device 13 suitable to separate and partly distance the leading ends of adjacent bars 12 from each other.

The counter/spacer device 13 may be of the type with an endless screw or of another conventional type.

When the bars 12 arrive from the cooling bed and are discharged onto the carrier plane 11, they are usually arranged overlapping if not twisted and entwined: this makes it extremely problematic to count them correctly and to efficiently form packs and orderly, homogenous layers.

The function of the counter/spacer device 13 is to act on the leading end of every bar 12 and to accelerate it with respect to the speed of advance of the movement elements 14, thus separating two adjacent bars 12 at least as regards the front segment of the leading end.

The separator assemblies 10 are arranged in the spaces between two adjacent movement elements 14 and are suitable to be made to function progressively, advantageously in a temporal sequence starting from assembly 10a nearest the leading end of the bar 12 until the farthest assembly 10b, to progressively separate one bar 12 from the adjacent bar for the whole of its length.

In other words, the first separator assembly 10a is suitable to be inserted into the gap between the leading ends of two adjacent bars 12 caused by the action of the counter/spacer device 13, the following separator assembly 10 is inserted into the gap caused by the first separator assembly 10a, and so on until the trailing ends of the bars 12 are separated.

The result of this operation is that two adjacent bars 12 are separated and distanced by a desired value to allow them to be counted efficiently and manipulated better.

Moreover, downstream from the separation device perfectly aligned and parallel bars 12 are obtained.

In this case, between two adjacent movement elements 14 there are two separator assemblies 10 according to the invention, but the case is the same if there is only one separator assembly 10, or three or more assemblies 10, in the space between two movement elements 14.

Each separator assembly 10 comprises separator means consisting, in this case, of three pairs of separator hooks 15 which can be activated simultaneously.

To be more exact, seen in the direction from the leading end of the bars 12 towards the trailing end, every assembly 10 has a first pair of hooks, respectively right 15a and left 115a, a second pair of hooks, right 15b and left 115b, and a third pair of hooks, right 15c and left 115c.

The hooks of every pair are identical, specularly mounted on the respective supports and different in form and size from the hooks of another pair, as will be explained hereafter.

To be more exact, the hooks 15 consist of two arms substantially at a right angle to each other, a first arm 29 substantially rectilinear and identical for all the hooks 15, and a second arched arm 30 of a different size and shape according to the position with respect to the counter/spacer device 13.

The right hooks 15a, 15b and 15c of every pair are attached cantilevered to a respective beam support consisting of a first cylinder 16 suitable to be made to rotate around its own substantially horizontal axis 17.

The left hooks 115a, 115b and 115c are attached to a respective beam support consisting of a second cylinder 18 suitable to be made to rotate around its own substantially horizontal axis 19, parallel and coplanar to the axis 17.

The two cylinders 16 and 18 are mounted, with their respective ends, on two supporting plates 27 and are arranged substantially parallel to the bars 112.

The hooks 15 lie and rotate on a vertical plane substantially orthogonal to the axis of the bars 12.

The rotation movement of the respective cylinders 16 and 18 serves to move all the hooks 15 from a first inactive position below the carrier plane 11 defined by the movement elements 14 (FIG. 2a), to a position progressively above said carrier plane 11 in order to reciprocally separate and distance the two adjacent bars 12a and 12b.

Figure 2A:
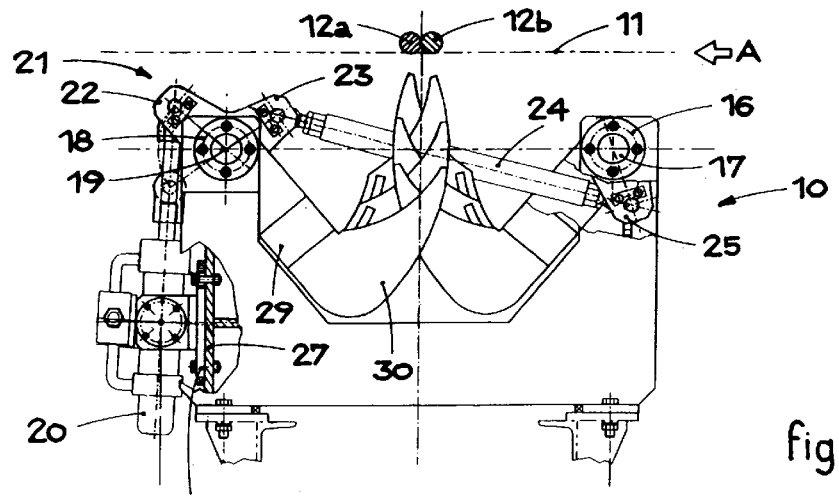
FIGS. 2a, 2b and 2c show a side view, respectively, of a separator assembly of the device according to the invention in three distinct operating positions.
Figure 2B:
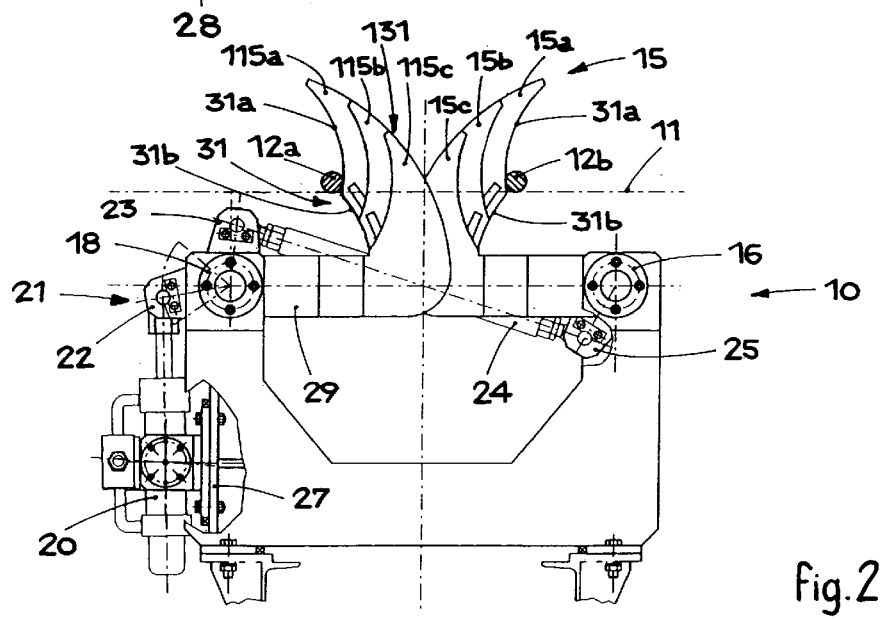
Figure 2C:
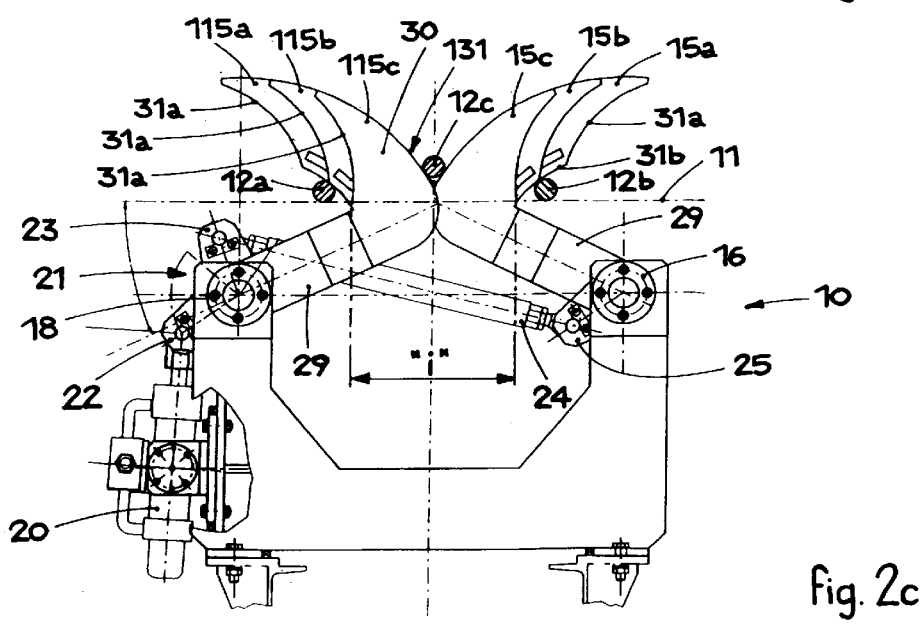
Figure 3:
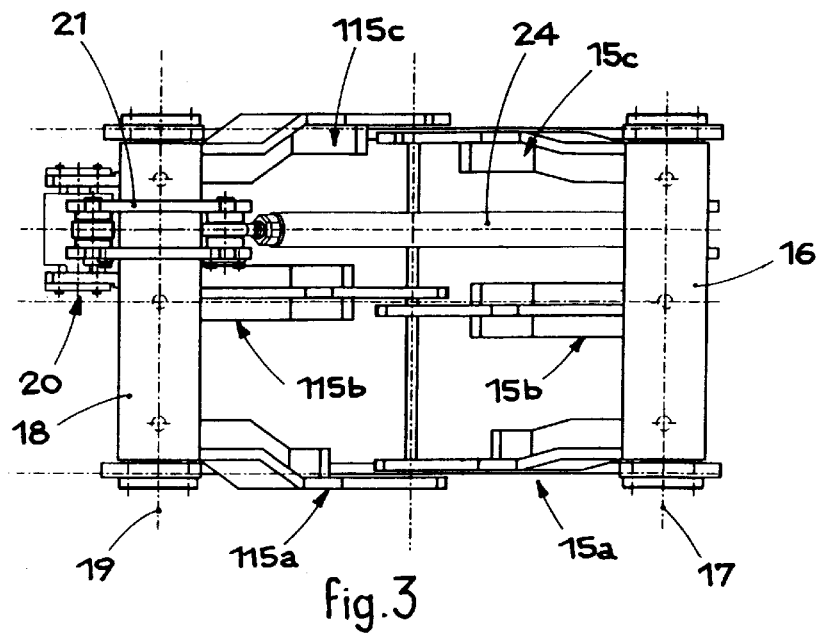
FIG. 3 is a view from above of a separator assembly according to the invention.
Figure 4:
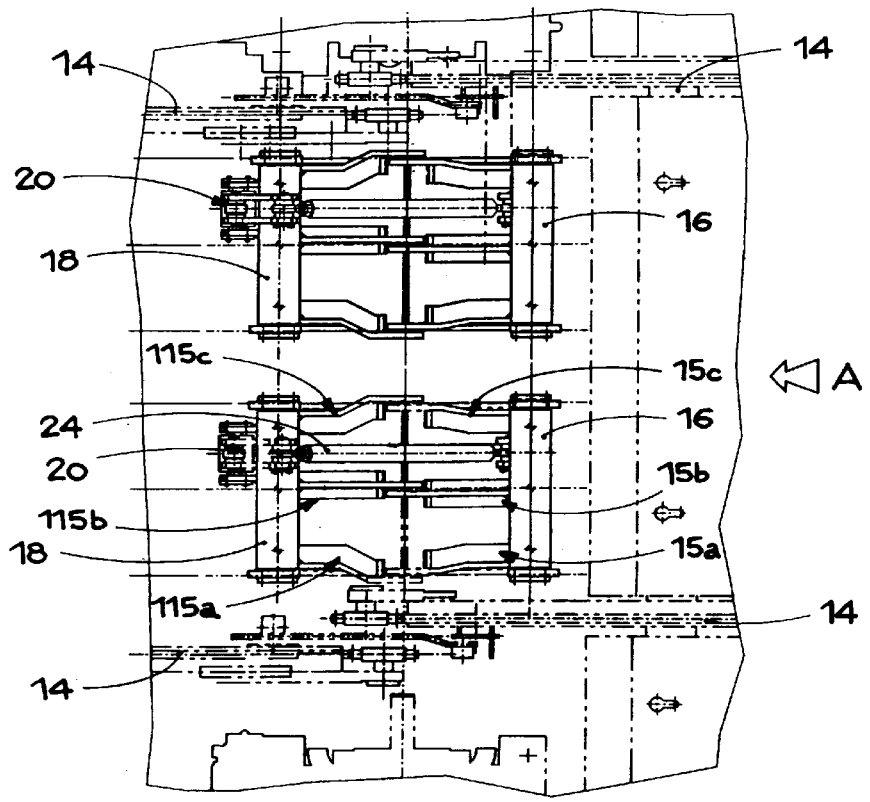
FIG. 4 is a view from above of a pair of separator assemblies according to the invention arranged in the space between two adjacent movement elements on the carrier plane.

FIG. 2b shows a second, intermediate working position, while FIG. 2c shows the hooks 15 in their maximum raised position with respect to the carrier plane 11, corresponding to the maximum value "i" of separation which can be obtained of the two adjacent bars 12a and 12b.

In this case, the two cylinders 16 and 18 are moved simultaneously and in a co-ordinated manner by the action of a single actuator 20 of the type with jacks which acts on an extension 22 of a lever element 21 solid with the second cylinder 18.

The actuator 20 is assembled on one of the supporting plates 27 by means of an assembly plate 28.

A second extension 23 of the lever element 21 is connected, by means of a transverse rod 24, to a bracket 25 solid with the first cylinder 16.

In this configuration, the drawing action of the actuator 20 causes the lever element 21, and therefore the second cylinder 18, to rotate around the axis of rotation 19; this rotation is transmitted to the first cylinder 18 by means of the transverse rod 24.

The transverse rod 24 can be regulated in size so as to allow the pairs of hooks 15 to be properly set.

The rotation of the two cylinders 16 and 18 lifts the hooks 15 and progressively moves them above the carrier plane 11 of the bars 12.

The inverse movement of the actuator 20 causes the cylinders 16 and 18 to rotate inversely, with a consequent lowering of the hooks 15 to a position below the carrier plane 11.

The second arm 30 of every hook 15 has a curved profile so as to generate, as it is raised, a movement of translation of the bar 12 on the carrier plane 11.

To be more exact, the second arm 30 has an inner profile 31 with a double arch defined by a first upper segment 31a and a consecutive second lower segment 31b.

The first upper segment 31a causes a progressive lateral displacement of the bar 12 while the relative hook 15 is raised with respect to the carrier plane 11, whereas the second lower segment 31b no longer causes any substantial displacement of the bar 12 even if the hook 15 continues in its upwards movement with respect to the carrier plane 11.

For the functioning of every separator assembly 10, FIG. 1 must be considered in combination with FIGS. 2a, 2b and 2c.

In FIG. 2a the hooks 15 are all in the inactive position below the carrier plane 11; the bars 12a and 12b are translated on the carrier plane 11 with only the respective segments of their leading end partly separated by the counter/spacer device 13, while the remaining segments towards the trailing end are overlapping and twisted together.

When the bars 12a and 12b are above the first separator assemblies 10, the hooks 15 are made to move upwards by activating the actuator 20.

The hooks 15, as seen before, are all activated simultaneously; however, the hooks 15a, 115a of the first pair, which are those nearest the counter/spacer device 13, meet the respective bars 12a and 12b first, since the respective second arms 30 of the first hooks 15a, 115a, are longer than the second arms 30 of the second hooks 15b, 115b, which in turn are longer than the second arms 30 of the third hooks 15c, 115c.

As it passes from the position shown in FIG. 2a to that shown in FIG. 2b, the first upper segment 31a of the profile 31 of the hook 15a introduces itself into the gap between two adjacent bars 12 created by the counter/spacer device 13, and progressively displaces the respective bar 12a towards the left by acting on a segment of bar near the leading end of the bar 12; the hook 115a displaces the bar 12b towards the right to an equal degree.

In an identical manner, in a position downstream and with a slight delay, the second hooks 15b and 115b come into contact with the respective bars 12a and 12b, introducing themselves into the gap created by the first hooks 15a and 115a, and thanks to the conformation of their inner profile 31, exert a further action of progressive separation, distancing and alignment of the bars 12a, 12b.

In a position even further downstream and after another brief delay, the third hooks 15c and 115c also enter into the gap between the two bars 12a and 12b and, with their inner profile 31, act in such a manner as to further separate the bars 12.

This distancing action is progressively propagated from one separator assembly 10 to the other, going towards the trailing end of the bars 12.

The distancing action is actuated only for the upper segment 31a of the inner profile 31 of the hooks 15.

When the upper segment 31a has been passed, a further raising of the hooks 15 no longer causes any substantial lateral displacement of the bars 12.

Since on all the hooks 15 the point where the upper segment 31a changes to the lower segment 31b of the respective inner profiles 31 is aligned on a single arc, as can be seen in FIG. 2b, the bar 12 emerging from the relative separator assembly 10, for that specific longitudinal segment, is perfectly aligned.

The progressive intervention of the successive separator assemblies 10 causes the consequential progressive alignment, over its whole length, of the bar 12 emerging from the separation zone, as can be seen in FIG. 1, distanced and perfectly aligned with the preceding bar 12.

The hooks 15 also have an arched outer profile 131 so as to prevent any bar 12c which might slip into an intermediate position outside the hooks 15 from being sheared in the subsequent closing and lowering movement to restore the inactive position as shown in FIG. 2a.

What is claimed is:

1. Apparatus to separate rolled bars advancing on a carrier plane with a direction substantially orthogonal to their axis towards a tying and/or packing zone, the carrier plane comprising a plurality of movement elements arranged in the direction of advance of the bars and longitudinally separated along a direction parallel to the longitudinal axis of the bars, the apparatus including a counter/spacer device for separating the leading ends of the bars from each other, the apparatus being characterised in that it comprises a plurality of separator assemblies arranged in alignment along the direction parallel to the longitudinal axis of the bars and each arranged in the space between two adjacent movement elements, each separator assembly comprising separator elements having a first inactive position arranged retracted below the carrier plane and a second active position wherein they are taken progressively above the carrier plane and, inserting themselves between two adjacent bars, cause the progressive separation thereof.

2. Apparatus as in claim 1, characterised in that the separator assemblies are suitable to be activated in a temporal progression starting from the assembly nearest the leading end of the bar until the assembly farthest from the leading end of the bar, in order to progressively separate one bar from the adjacent bar for the whole of its length.

3. Apparatus as in claim 1, wherein the separator elements are shaped so that, as they are taken progressively above the carrier plane in the second active position, the separator elements cause the two adjacent bars to move laterally away from one another while remaining on the carrier plane.

4. Apparatus as in claim 1, characterised in that every separator assembly comprises a pair of hook elements counter-opposed and rotating on respective horizontal axes with an opposite direction of rotation, each of the hook elements being suitable to act on a respective bar to cause them to be distanced in reciprocal opposite directions.

5. Apparatus as in claim 4, characterised in that the hook elements have an arched outer profile so as not to cause any bar, possibly positioned between two hook elements of a pair during the counter-opposed rotation of the hook elements, to be sheared.

6. Apparatus as in claim 1, characterised in that every separator assembly comprises two or more pairs of the separator elements, each pair comprising counter-opposed and identical hook elements but different in shape and size from the hook elements of the adjacent pair, the pairs of hook elements being longitudinally distanced along the bar and suitable to be made to rotate simultaneously from the first inactive position below the carrier plane to the second active position above the carrier plane.

7. Apparatus as in claim 6, characterised in that the two or more pairs of hook elements of every separator assembly are suitable to act on the bars in a temporal progression starting from those nearest the leading end of the bar.

8. Apparatus as in claim 6, characterised in that every pair of hook elements has a respective right hook element and a respective left hook element, the right hook elements and the left hook elements being mounted cantilevered on respective beam supports rotating on respective axes of rotation which are substantially parallel and coplanar.

9. Apparatus as in claim 1, characterised in that the separator means consist of hook elements, rotating on a substantially horizontal axis and including an arched inner profile suitable to act on a relative bar as the hook elements are gradually moved above the carrier plane.

10. Apparatus as in claim 9, characterised in that the arched inner profile of the hook element is defined by a first upper segment the function of which is to laterally displace a relative bar as the hook element is raised with respect to the carrier plane, and by a second lower segment which does not cause any displacement of the relative bar even if the hook element is further raised with respect to the carrier plane.

11. Apparatus as in claim 10, characterised in that every separator assembly comprises two or more pairs of the hook elements, each pair comprising of counter-opposed and identical hook elements but different in shape and size from the hook elements of the adjacent pair, the pairs of hook elements being longitudinally distanced along the bar and suitable to be made to rotate simultaneously from the first inactive position below the carrier plane to the second active position above the carrier plane; wherein every pair of hook elements has a respective right hook element and a respective left hook element, the right hook elements and the left hook elements being mounted cantilevered on respective beam supports rotating on respective axes of rotation which are substantially parallel and coplanar.

12. Apparatus as in claim 11, characterised in that the first upper segment and the second lower segment of the inner profile of each hook element defines a point of inversion, the points of inversion of all the right hook elements and, respectively, of all the left hook elements being aligned substantially on a single respective arc.

13. Apparatus as in claim 9, characterised in that the hook element consists of a first arm attached to a relative support and movement element, and of a second arched arm substantially at a right angle with respect to the first arm.

14. Apparatus as in claim 13, characterised in that every separator assembly comprises two or more pairs of the hook elements, each pair comprising counter-opposed and identical hook elements but different in shape and size from the hook elements of the adjacent pair, the pairs of hook elements being longitudinally distanced along the bar and suitable to be made to rotate simultaneously from the first inactive position below the carrier plane to the second active position above the carrier plane; wherein the two or more pairs of hook elements of every separator assembly are suitable to act on the bars in a temporal progression starting from those nearest the leading end of the bar.

15. Apparatus as in claim 14, characterised in that in every separator assembly the hook elements of the pair nearest the leading end of the bar have the respective second arms longer than the second arms of the hook elements of the respective adjacent pair farthest from the leading end of the bar.

\* \* \* \* \*